E. L. AURAND.
PORTABLE ELECTRIC PLANT.
APPLICATION FILED MAY 1, 1918.

1,398,058.

Patented Nov. 22, 1921.
6 SHEETS—SHEET 1.

WITNESSES

INVENTOR
EDWARD L. AURAND.
BY
ATTORNEY

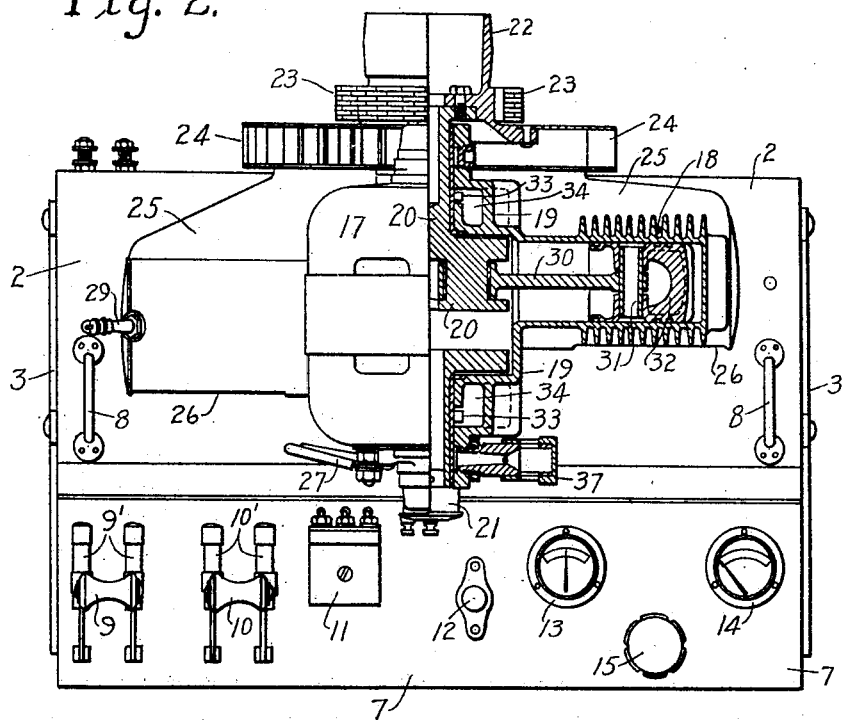

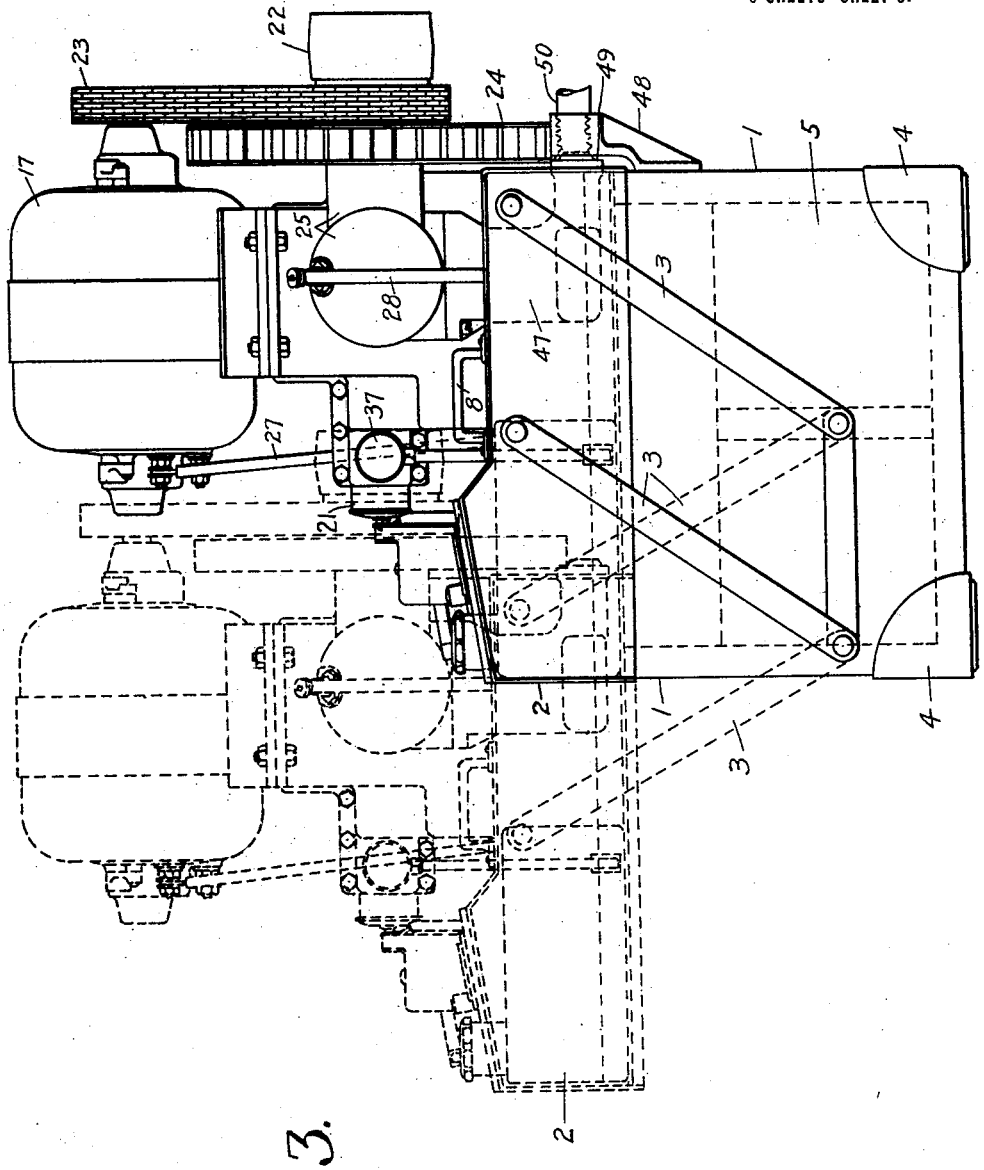

E. L. AURAND.
PORTABLE ELECTRIC PLANT.
APPLICATION FILED MAY 1, 1918.
1,398,058.
Patented Nov. 22, 1921.
6 SHEETS—SHEET 4.
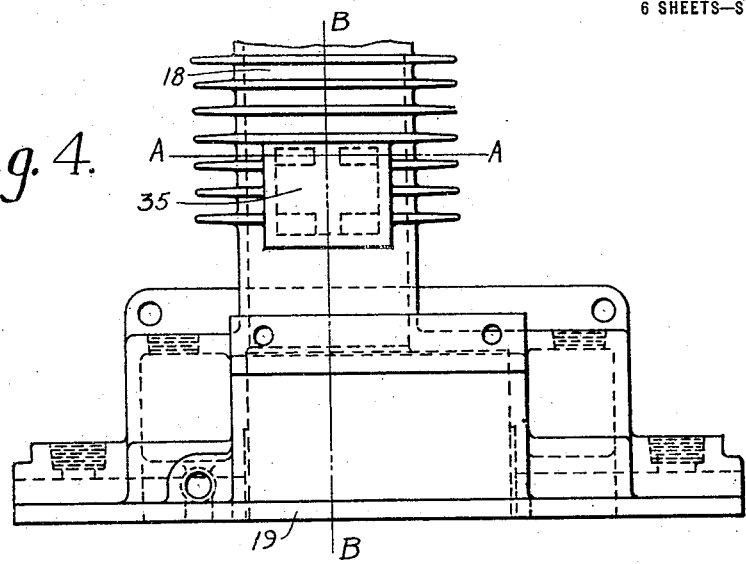
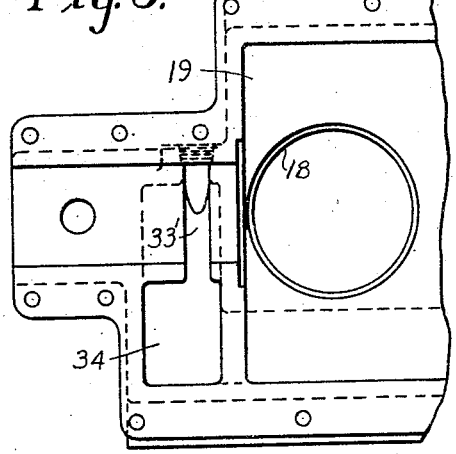
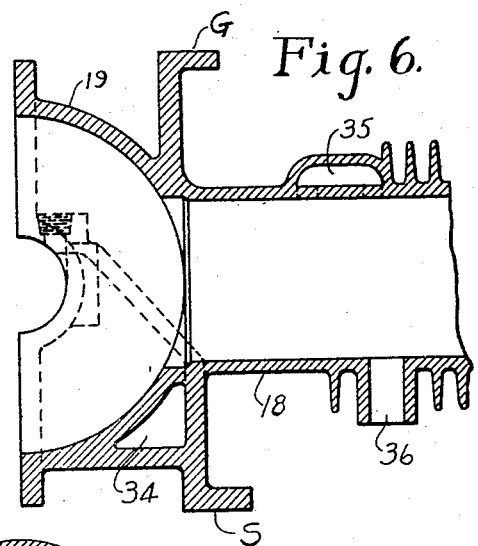
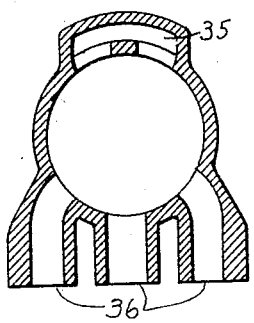
WITNESSES
INVENTOR
EDWARD L. AURAND.
BY
ATTORNEY

E. L. AURAND.
PORTABLE ELECTRIC PLANT.
APPLICATION FILED MAY 1, 1918.

1,398,058.

Patented Nov. 22, 1921.

WITNESSES

INVENTOR
EDWARD L. AURAND.

BY
ATTORNEY

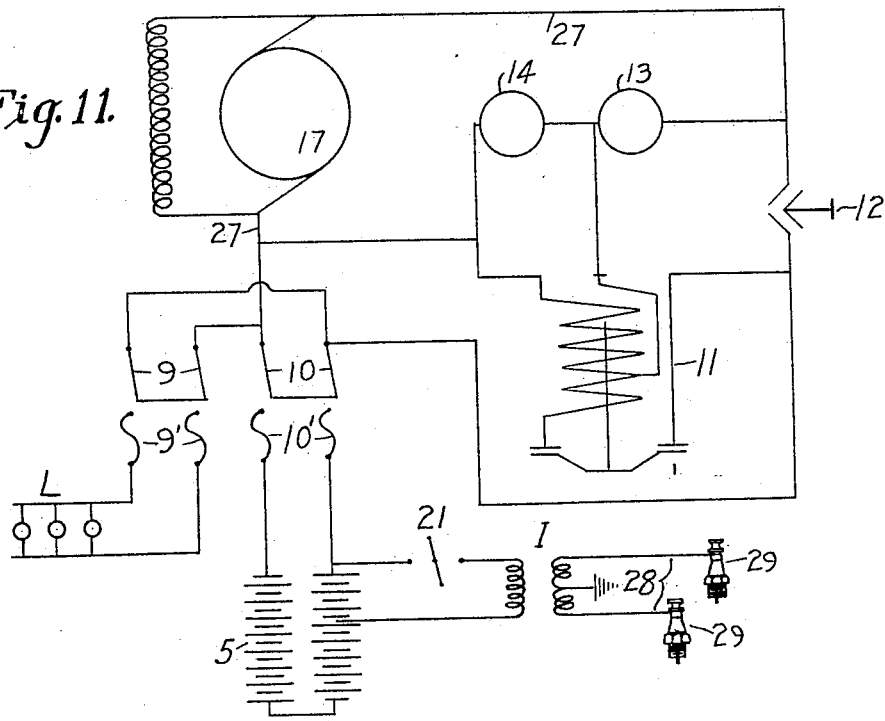

UNITED STATES PATENT OFFICE.

EDWARD L. AURAND, OF DETROIT, MICHIGAN.

PORTABLE ELECTRIC PLANT.

1,398,058.   Specification of Letters Patent.   Patented Nov. 22, 1921.

Application filed May 1, 1918. Serial No. 231,827.

*To all whom it may concern:*

Be it known that I, EDWARD L. AURAND, a citizen of the United States, residing at Detroit, in the county of Wayne and State of Michigan, have invented a new and useful Portable Electric Plant, of which the following is a specification.

My invention relates to portable unit electric plants adapted especially for use in light and power installations in rural or other isolated homes and residences. Among the objects of the invention are to provide a simple and economical, compact self containing portable electric plant capable of developing such light and power as is reasonably necessary with little care and attention, and to provide a plant that is easily operated and the parts of which are easily accessible.

I attain these objects by the construction illustrated in the accompanying drawings which form a part of this specification and in which,—

Fig. 2 is a top view of the plant, the left half being a plan and the right half a horizontal section through the crank shaft and engine parts.

Fig. 3 is a side elevation of the plant showing in dotted lines the position of parts when the battery box cover is swung aside to give access to the batteries.

Fig. 4 is an enlarged plan view of an engine cylinder and its corresponding half of the crank case.

Fig. 5 is an open end view of a part of one half of the crank case showing the cored oil reservoir construction.

Fig. 6 is a longitudinal section of a cylinder and crank case half on the line B—B of Fig. 4.

Fig. 7 is a cross section of a cylinder on line A—A of Fig. 4.

Fig. 11 is a diagrammatic showing of the electric wiring of the plant.

Throughout the several figures of the drawing the same reference numerals and letters indicate the same or like parts.

Figure 1:
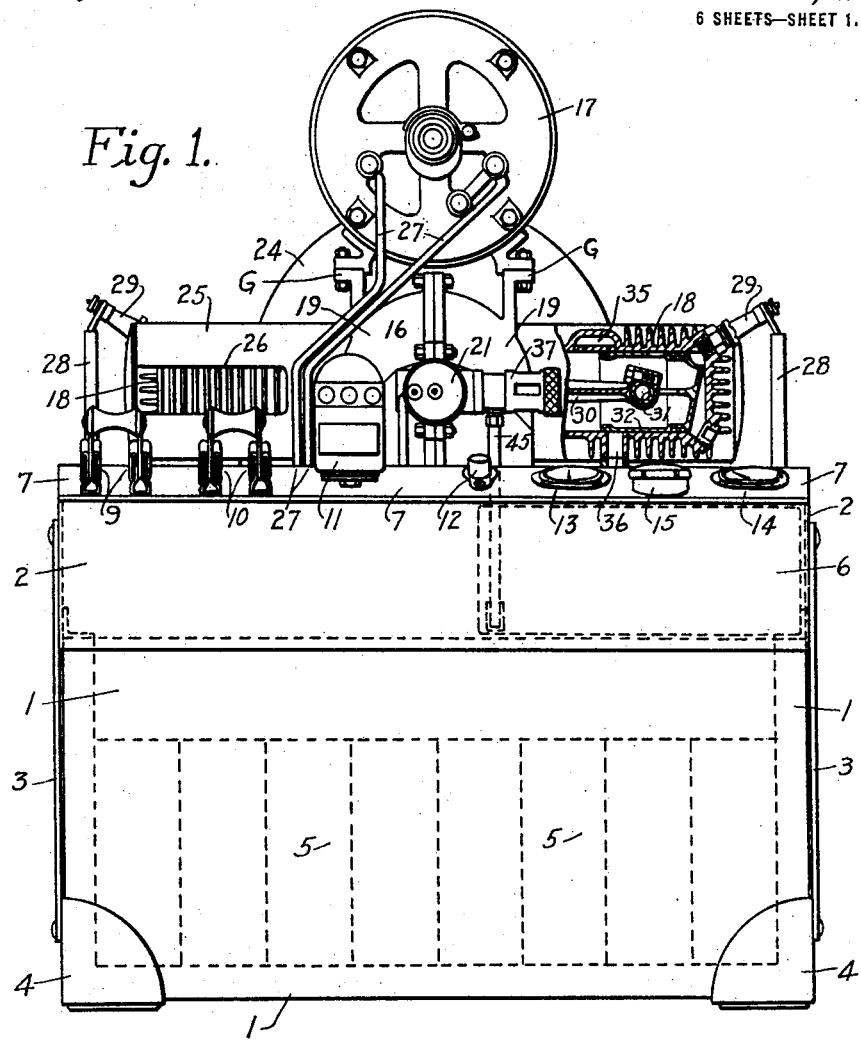
Figure 1 is a front elevation of an assembled plant with a part cut away showing a portion of the right hand engine cylinder in longitudinal vertical section.
Figure 8:
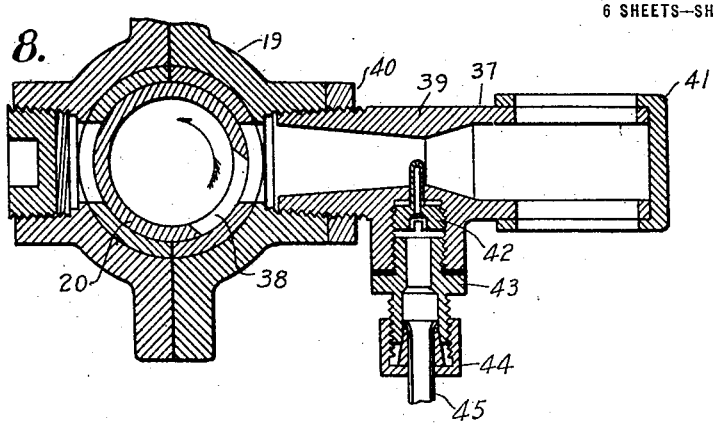
Fig. 8 is a vertical cross section enlarged through the mixing valve and connections and the end of the crank case and shaft.

In general the electric plant in this invention consists of an internal combustion engine, an electric generator arranged to be driven by the engine, and storage batteries and accessories properly electrically connected and all arranged in compact, durable and convenient form.

The foundation for the plant is a substantial box 1 of wood or metal or other material, with a movable cover 2. The cover 2 is movably attached to the box 1 by parallel hinge straps 3 which allow the cover to be lifted and swung forward in upright position to the edge of the box as shown in Fig. 3. The corners of box 1 may be reinforced by sheet steel feet 4.

5 are storage batteries properly insulated and set snugly in box 1. The gasolene or other fuel tank 6 is fastened in the cover 2 under a switch board panel 7 along the front of the cover. Panel 7 is of suitable insulating material and forms the plant switch and instrument board.

8 are handles on the box cover for lifting and moving the cover.

On the switch board panel 7 are located the light switch 9 with fuses 9', generator switch 10 with fuses 10', an automatic cutout 11, starter press button switch 12, ammeter 13, voltmeter 14, and gasolene filling spout 15. The spout 15 leads down into fuel tank 6 under the panel.

Excepting the lead wires from the generator or dynamo and to the engine, all electric wiring is installed under the panel 7 and is not shown except in diagrammatic form in Fig. 11. The wiring is arranged in convenient form and according to established standards.

The engine 16 is arranged immediately above the box cover and is bolted to the cover through supporting brackets S (Fig. 6) on the crank case. Opposite and upwardly extending brackets G on the engine crank case support a shunt wound dynamo electric machine or motor-generator 17 immediately above the center of the engine. Both engine and the dynamo or generator are arranged as low as possible to keep the center of gravity of the plant low.

Engine 16 is a two cycle engine with crank case compression, with two horizontal opposed cylinders 18. Each cylinder is cast with one-half of the crank case 19 and both cylinders and their corresponding half crank case are identical in construction and may be made from one pattern. The cylinder 18 is off-set to one end of the crank space of the half crank case 19 so that when the two cylinders are assembled opposing each other and the crank case halves bolted together the cylinders are off-set laterally to provide for the spacing of the connecting rods on the crank shaft; see Figs. 4, 5 and 2.

Crank shaft 20 is constructed with opposite throws for the connecting rods 30 of the two cylinders. The shaft bearings are at the two ends of the crank case. The front end of the crank shaft is hollow to provide an intake for the gas mixture as explained below. The extreme end of the shaft is plugged and carries a timer 21.

Upon the opposite end of the engine shaft is mounted a pulley 22, a drive sprocket for silent chain 23, and a sirocco fan 24.

The engine cylinders are covered by a sheet iron casing 25 opening at the back into the sirocco fan and having longitudinal slots 26 along the front of the cylinders. Thus the cooling air current is drawn through slots 26 over the cooling ribs or fins of the cylinders and out through the fan.

27 are the main electric cables leading from the generator down through the cover to the batteries and are of sufficient length under the cover to allow of lateral movement of the cover in opening the battery box. 28 are the high tension wires leading from the induction coil to the spark plugs 29 in the cylinders.

30, 31 and 32 indicate, respectively, the connecting rod, wrist pin and piston in one cylinder.

The crank case formed by bolting the two halves 19 together incloses the crank shaft with bearings at each end of the case. Around the chamber thus housing the crank shaft are cored oil chambers or reservoirs 34 in which oil is placed for the main shaft bearings. The shaft is oiled by ring or chain oilers 33 dipping into the oil and running through slots 33' and over the shaft.

35 are by-passes in the upper walls of the cylinders for by-passing the compressed mixture in the crank case to the combustion chambers above the pistons. 36 are multiple exhaust ports through the lower walls of the cylinders for the exhaust of burnt gases. The exhaust ports 36 of both cylinders open downward into an exhaust manifold 47 under the box cover. Manifold 47 fits by a slip joint into a bracket 48 at the side of the box 1; the joint is provided with gasket 49 and is held snug by the weight of cover and supported parts. An exhaust pipe 50 screwed into bracket 48 leads off to any convenient point.

The carbureter or mixing valve 37 is screwed into an opening in the front end of the crank case and bearing just back of the timer. The mixing valve shown consists of a body 39 screwed into the opening and locked to the crank case by lock nut 40. The inner face of this body is in the shape of a Venturi tube, and near the throat of the venturi is seated a jet 42 which has a projection extending into the venturi. The jet has the proper size opening to give efficient operation at the desired motor speed. The body 39 is slotted at its outer end and carries a slotted sleeve 41 movable to regulate the air. A gasolene union 43 is screwed into the body and has a union nut 44 holding the gasolene pipe 45 leading up from fuel tank 6 under the box cover.

A port 38 in the hollow crank shaft revolves past the mixing valve opening in the case and admits mixture to the hollow shaft and into the crank chamber at the proper times. The location of this intake port is such that when the pistons are at their innermost position in the cylinders the leading edge of the intake port 38 starts to pass the intake opening from the mixer, and the trailing edge of the port passes the mixer opening when the pistons are at their outermost positions in the cylinders. The vacuum thus produced by the pistons moving outward draws the mixture through the hollow shaft into the crank chamber. The intake port is then closed and the inward movement of the pistons compresses this charge in the crank chamber. When the pistons are about 135° past top center and on their inward movement, the piston head draws past the edge of exhaust ports 36 opening these ports and the burnt gases pass out. At about 25° further movement, or about 160° past top center the intake port of by-pass 35 is opened and the fresh compressed mixture in the crank chamber is by-passed through ports in the piston and the by-pass 35. The piston top is made to deflect the fresh gas to the head of the cylinder as shown. Further revolution of the crank shaft and movement of the pistons closes the intake by-pass and exhaust ports and the gas is compressed in the head of the cylinder and fired.

Figure 9:
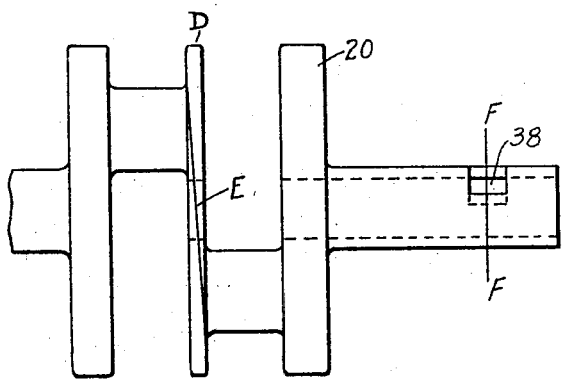
Fig. 9 is an enlarged detail of a part of the crank shaft.
Figure 10:
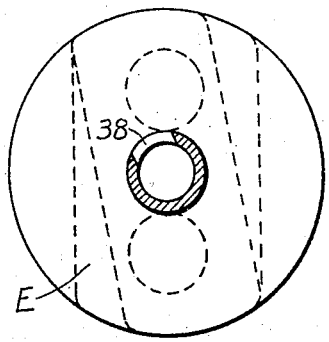
Fig. 10 is an end view of the crank shaft and cross section on line F—F of Fig. 9.

The center web D of the crank shaft is drilled to allow the gas mixture to pass. To further balance the mixture in the crank chamber and prevent the back cylinder from "starving" for gas on account of the resistance offered by the web D, this web is partially cut away and beveled as shown at E, Figs. 9 and 10, to act as a propeller to force gas to that side.

Fig. 11 indicates in diagram the manner of wiring the plant, the reference numerals on the diagram indicating the same parts as indicated by the same numerals on the other figures. L indicates the power or light circuit, and I indicates the induction coil of the ignition system, the induction coil having two secondaries. The ignition is taken, as indicated, from three cells of the battery.

To start the engine and generator the generator switch 10 is closed and the starter button switch pressed. This connects the batteries through the generator, which acting as a motor drives the engine through chain 23. As soon as the engine fires and starts the starter button is released and the engine then drives the generator.

The power or lights are thrown into circuit by closing light switch 9. If switch 10 is then open the lights are run from the generator alone; if switch 10 is closed while the generator or dynamo is working the storage batteries float on the line, furnishing or receiving current according to the load. With the engine stopped the lights may be run from the batteries by closing both switches 9 and 10.

To inspect the batteries or give them any needed attention, the cover 2 together with the engine and generator are lifted and moved forward by grasping the handles 8 and swinging the cover forward as shown in Fig. 3. The straps 3 hold the top with the engine and generator in upright position and allow the cover to rest on the edge of the box, they being so placed as to bring the center of gravity of the cover and attached parts near the edge of the box. The weight of the batteries insures against any liability of the plant tipping over. The cover is again put in place by swinging it back to the original position.

I claim:

1. In a portable electric plant consisting of an engine, generator and storage batteries, the combination of a covered box containing said batteries, the engine anchored to the box cover and the said generator anchored to and immediately above the engine, substantially as described.

2. In a portable electric plant, storage batteries nested in a box, a cover on said box movable to allow access to said batteries, an engine anchored to said cover, a generator immediately above and anchored to said engine and operatively geared thereto, a switch board on said cover, and electrical connections electrically connecting said generator, batteries and switchboard, substantially as described.

3. In a portable electric plant, the combination of storage batteries nested in a covered box, the cover of said box being hinged to said box to allow lateral upright movement of the cover to give access to said batteries, a switch board on said cover, a fuel tank under said cover and an internal combustion engine fastened to the top of said cover, a generator disposed immediately above and anchored to said engine, with operative and electrical connections between said parts, substantially as described.

EDWARD L. AURAND.

Witnesses:
 ZELLA M. AURAND,
 ESTHER I. AURAND.